United States Patent [19]

Tünkers

[11] 4,445,676

[45] May 1, 1984

[54] FLUID-OPERATED BELL CRANK CLAMPING DEVICE WITH ELASTIC SPRING LINK AND RELEASABLE CLAMPING ARM

[75] Inventor: Josef-Gerhard Tünkers, Ratingen, Fed. Rep. of Germany

[73] Assignee: Tuenkers Maschinenbau G.m.b.H., Ratingen, Fed. Rep. of Germany

[21] Appl. No.: 361,455

[22] Filed: Mar. 24, 1982

[30] Foreign Application Priority Data

Aug. 5, 1981 [DE] Fed. Rep. of Germany ....... 3130942

[51] Int. Cl.[3] .............................................. B23Q 3/02

[52] U.S. Cl. ....................................... 269/32; 269/94; 269/238; 269/93; 74/105; 74/470

[58] Field of Search ..................... 269/32, 93, 94, 237, 269/238; 74/470, 105

[56] References Cited

U.S. PATENT DOCUMENTS

| | | | |
|---|---|---|---|
| 3,170,214 | 2/1965 | Cochrane | 269/94 X |
| 3,388,611 | 6/1968 | Clary et al. | 74/470 X |
| 4,240,620 | 12/1980 | Tunkers | 269/32 X |

FOREIGN PATENT DOCUMENTS

| | | | |
|---|---|---|---|
| 2222686 | 11/1973 | Fed. Rep. of Germany | 269/94 |
| 2555207 | 7/1976 | Fed. Rep. of Germany | 269/94 |

*Primary Examiner*—Frederick R. Schmidt
*Assistant Examiner*—Steven P. Schad
*Attorney, Agent, or Firm*—Michael J. Striker

[57] ABSTRACT

A fluid-operated clamping device comprises a support forming a cylinder in which a piston is reciprocatable. A piston rod fixed to piston has a free end projecting beyond the cylinder. A bell crank is pivotally mounted on a portion of the support extending beyond the cylinder. A clamping arm is preferably releasably connected to one arm of the bell crank and has a V-shaped end portion extending transverse to the remainder of the clamping arm adapted to clamp a sheet metal or the like between the V-shaped end portion and a matching V-shaped notch on the upper surface of a stationary anvil. A link comprising at least one spring plate partly divided by a preferably T-shaped slot extending from one side thereinto into two resilient end portions is arranged between the free end of the piston rod and the other arm of the bell crank with one end portion pivotally connected to the free end of the piston rod and the other end portion pivotally connected to the other arm of the bell crank. The springy link will not only permit construction of the device with relatively large tolerances, but will also prevent excessive clamping forces during operation of the device.

9 Claims, 3 Drawing Figures

FLUID-OPERATED BELL CRANK CLAMPING DEVICE WITH ELASTIC SPRING LINK AND RELEASABLE CLAMPING ARM

BACKGROUND OF THE INVENTION

The present invention relates to a fluid-operated bell crank clamping device. In such fluid-operated bell crank clamping devices it is essential that such devices are constructed to operate in a safe and exact manner and have an extended useful life. Experience has shown that this will depend essentially on the manner in which the axial movement of the piston and the piston rod is transmitted to the crank level of the device. This will require that the transmission of the axial movement of the piston rod onto the bell crank of the device is accomplished by a specially constructed and arranged means.

A hydraulically or pneumatically operated bell crank clamping arrangement is known in which the axial movement of the piston rod is transmitted by rigid link to the bell crank portions of the device (German Offenlegungsschrift No. 22 22 686). In this known device in which the axial movement of the piston rod is transmitted over a rigid link to the bell crank of the device there are created relatively large forces when the device is brought in the clamping position, which results in disadvantageously large loading of the different parts of the device. This, in turn, will result into excessive wear of certain parts of the device, which may lead eventually to the necessity to replace such worn parts. Such an exchange of worn parts is evidently rather time consuming especially if it requires removing of the clamping arms from its exact adjusted working position. It is therefore desirable and of great advantage during occurring breakdown of the device to leave the clamping arm in its predetermined exactly adjusted operating position so that a quick and easy replacement of the clamping device without clamping arm is possible.

SUMMARY OF THE INVENTION

It is an object of the present invention to provide a fluid-operated bell crank clamping device which avoids the disadvantages of such clamping devices known in the art.

It is a further object of the present invention to provide a clamping device of the afore-mentioned type which will be subjected to less wear than such clamping devices known in the art so as to have an extended useful life.

It is a further object of the present invention to provide a clamping device of the above-mentioned kind, in which eventually necessary repairs can be carried out quickly and with less expenditures than is necessary in such clamping devices known in the art.

It is yet a further object of the present invention to provide a clamping device of the aforementioned kind in which workpieces with different tolerances may be properly clamped without creating excessive clamping forces.

With these and other objects in view, which will become apparent as the description proceeds, the fluid-operated clamping device according to the present invention mainly comprises support means forming a cylinder, a piston reciprocatable in the cylinder, a piston rod fixed at one end to the piston and having opposite free end projecting beyond the cylinder, a bell crank mounted on the support means for tilting movement about a pivot axis substantially normal to the piston rod and having a first arm and a second arm extending transverse to the first arm, spring link means formed at a central portion thereof with a slot extending from one side thereof thereinto and partly dividing the spring link means into two springy end portions, a first pin pivotally connecting one of these end portions to the free end of the piston rod, a second pin pivotably connecting the other end portion to one of the arms of the bell crank, and a clamping arm connected to the other arm of the bell crank.

The slot which partly divides the spring link means into two springy end portions is preferably T-shaped.

According to another feature of the present invention, the clamping arm is releasably connected to the other arm of the bell crank.

The spring link means comprises at least one plate-shaped spring or a plurality of superimposed plate-shaped spring of equal configuration.

The clamping arm has an elongated portion extending substantially in direction of the other arm of the bell crank, and has a free end portion extending transverse to the elongated portion and having a V-shaped end adapted to cooperate with a matching V-shaped notch in the upper face of the stationary anvil, to clamp a workpiece therebetween.

One essential advantage of the clamping device according to the present invention is that the axial movement of the piston rod is transmitted to the bell crank of the device not by a rigid link but by an elastic spring link which produces in its tensioned end position a permanent clamping force so that the clamping arm is pressed against an anvil with a substantially constant clamping force. This leads also to the advantage that workpieces of sheet metal of different thickness may be properly clamped between the end portion of the clamping arm and the anvil. The springy link connecting the free end of the piston rod with one arm of the crank lever will assure that the clamping device and the parts connected thereto will be protected from damage so that the operating safety and the useful life of the device will be considerably increased.

Eventually it may be necessary to replace parts of the clamping device. Such an operation is rather time-consuming because the clamping arm had to be removed from its exact adjusted position. This disadvantage of such clamping devices known in the art is overcome according to the present invention in that the clamping arm is releasably connected by screws or the like to one arm of the belt crank. This will permit during any necessary exchange of parts of the clamping device to leave the clamping arm in its exact adjusted position and to detach only its connection with the arm of the crank lever in order to remove the remainder of the clamping device from the clamping arm. After repair or exchange of one part of the device the clamping arm which remains in its adjusted position can then simply again be connected to the corresponding arm of the crank lever.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
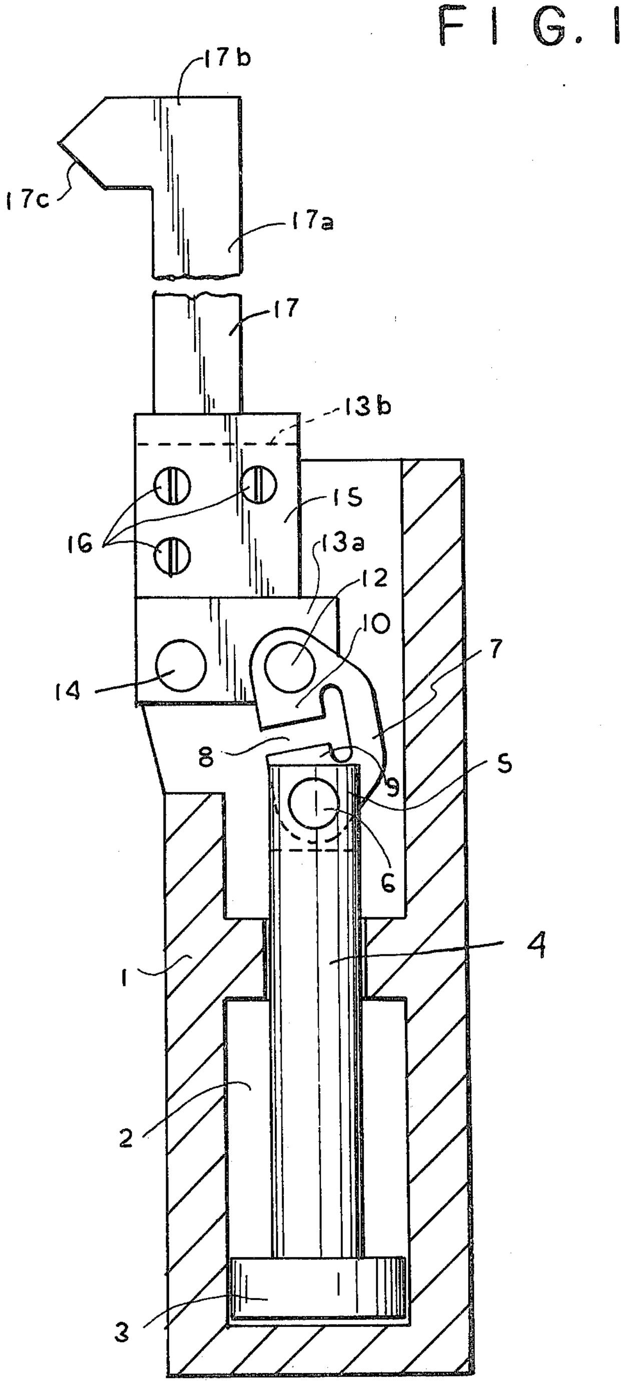
FIG. 1 is a longitudinal section of the clamping device in its rest position.

The clamping device according to the present invention comprises an upright housing or support means 1 forming in its lower part a cylinder space 2 in which a piston 3 is reciprocatable by alternatingly feeding in a manner known per se, and not shown in the drawing, pressure fluid into opposite ends of the cylinder space 2. A piston rod 4 fixedly connected at one end to the piston 3 projects properly guided with its opposite end beyond the cylinder space 2. A bell crank 13 is mounted by a pivot pin 14 on an upper part of the housing 1 above the cylinder space 2 for pivotal movement about the axis of the pivot pin 14 which extends substantially normal to the axis of the piston rod 4. A spring link 7 is arranged between the free end of the piston rod and one arm of the bell crank 13. The spring link 7 comprises at least one plate of spring material or a plurality of superimposed plates of spring material of equal shape and form with a preferably T-shaped slot 8 extending from one side of the plate-shaped spring link thereinto so as to partly divide the same into two opposite end portions 9 and 10 divided by the slot 8 and the end portion 9 is pivotally connected by a pin 6 to the free end 5 of the piston rod 4, whereas the end portion 10 of the spring link 7 is pivotally connected by a pin 12 to the arm **13*a* of the bell crank 13. A clamping arm 17 has at one end a plate-shaped enlarged portion 15 which is releasably connected by a plurality of screws 16 or the like, to the other arm 13*b* of the bell crank 13. The clamping arm 17 extends with an elongated portion 17*a* from its plate-shaped portion 15 substantially in the direction of the arm 13*b* and has an end portion 17*b* extending substantially normal to the elongated portion 17*a* and having a V-shaped end 17*c* adapted to cooperate with a V-shaped notch 18*a* formed in the upper face of a stationary anvil 18** arranged laterally of the clamping device for clamping and spanning, for instance, a sheet metal workpiece therebetween.

Figure 2:
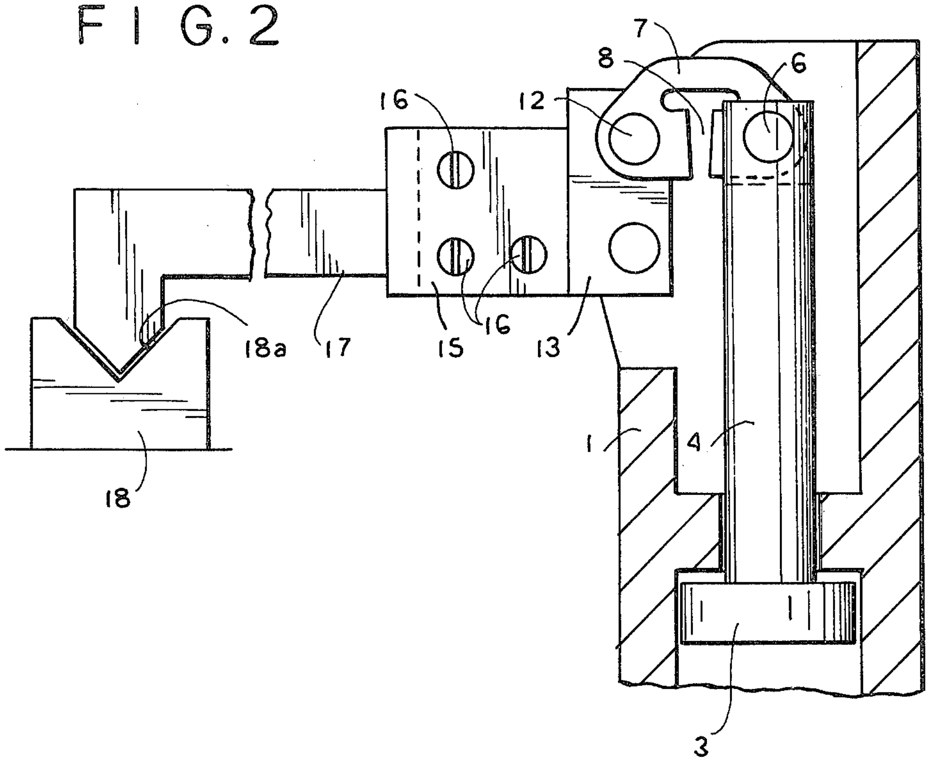
FIG. 2 is a longitudinal section of the clamping device in the clamping position of the bell crank and the clamping arm.

During operation of the clamping device pressure fluid is fed in a manner known per se and not shown in the drawing into the cylinder space 2 beneath the piston 3 so as to move the clamping arm 17 from the position shown in FIG. 1 to the position shown in FIG. 2 so that the workpiece located between the end portion **17*c* of the clamping arm 17 and the notch 18*a* of the anvil 18** may be held and properly clamped. The resilient spring link will thereby prevent exertion of excessive clamping forces on the workpiece even if workpieces of different thickness are used.

Figure 3:
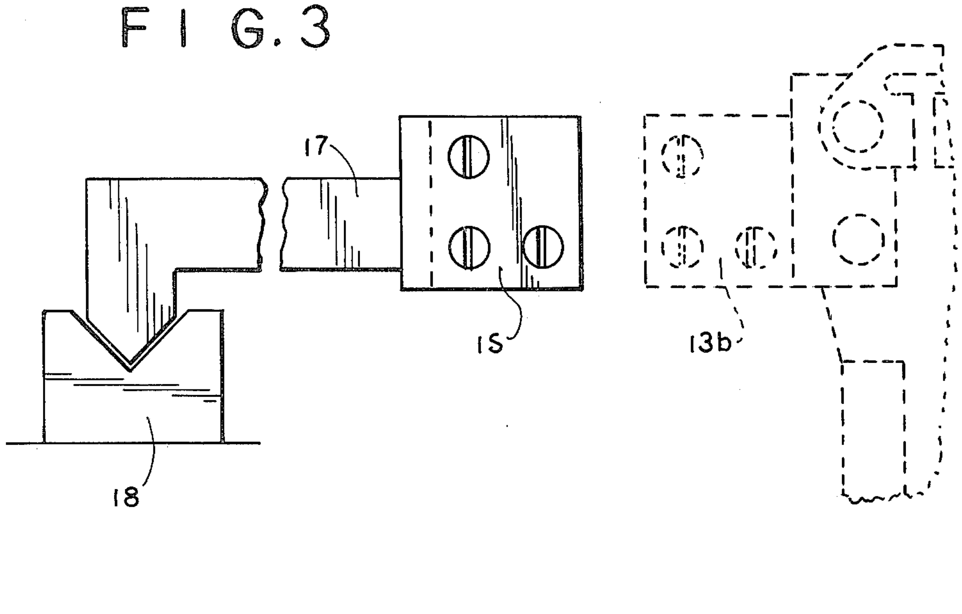
FIG. 3 shows the clamping arm in its working position disengaged from the remainder of the clamping device.

During any necessary repair it will be advantageous to remove the clamping arm 17 from the remainder of the clamping device while leaving the clamping arm in its working position in which its V-shaped end portion **17*c* is engaged in the notch 18*a* of the anvil 18 as shown in FIG. 3. After the necessary repair of the remainder of the clamping device the plate-shaped portion 15 of the clamping arm may then be reconnected by the screws 16 or the like to the arm 13*b*** of the bell crank.

It will be understood that each of the elements described above, or two or more together, may also find a useful application in other types of fluid-operated bell crank clamping devices differing from the types described above.

While the invention has been illustrated and described as embodied in a fluid-operated bell crank clamping device with elastic spring link and a releasable clamping arm, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A fluid-operated clamping device comprising support means forming a cylinder; a piston reciprocatable in said cylinder; a piston rod fixed at one end to said piston and having opposite free end projecting beyond said cylinder; a bell crank mounted on said support means for tilting movement about a pivot axis substantially normal to said piston rod and having a first arm and a second arm extending transverse to said first arm; a clamping arm connected to the other arm of said bell crank readily releasably so as to allow removal of parts of the clamping device from said clamping arm for their replacement without removing said clamping arm from its working position; and spring link means formed at a central portion thereof with a slot extending from one side thereinto and partly dividing said spring means into two springy end portions pivotally connected with said free end of said piston rod and one of said arms of said bell crank respectively so as to allow clamping of workpieces with a substantially constant clamping force and also clamping of workpieces having different thicknesses.

2. A fluid-operated clamping device as defined in claim 1, wherein said slot in said spring link is T-shaped.

3. A fluid-operated clamping device as defined in claim 1, wherein said spring link means comprises at least one plate-shaped spring.

4. A fluid-operated clamping device as defined in claim 1, wherein said clamping arm has an elongated portion extending substantially in the direction of said other arm and has a free end portion extending transverse to said elongated portion and having a V-shaped end.

5. A fluid-operated clamping device as defined in claim 1, wherein said clamping arm extends in one end position of said piston in said cylinder substantially parallel to said piston rod and in the other end position of said piston substantially normal to said piston rod, and including an anvil having a V-shaped notch in its upper face matching said V-shaped end portion of said clamping arm for clamping in said other end position of said piston a sheet metal workpiece or the like between said V-shaped end of said clamping arm and said V-shaped notch of said anvil.

6. A fluid-operated clamping device as defined in claim 1; and further comprising a first pin pivotally connecting one of said end portions of said spring means to said free end of said piston rod, and a second pin pivotally connecting the other of said end portions of said spring means with said one arm of said bell crank.

7. A fluid-operated clamping device as defined in claim 1; and further comrpising means for readily releasably connecting said clamping arm with said other arm of said bell crank and including screws.

8. A fluid-operated clamping device as defined in claim 1, wherein said spring means is formed as a spring link composed of at least one plate of a spring material.

9. A fluid-operated clamping device as defined in claim 1, wherein said spring means is formed as a spring link composed of a plurality of superimposed plates of a spring material.

* * * * *